DEFENSIVE PUBLICATION

UNITED STATES PATENT OFFICE

Published at the request of the applicant or owner in accordance with the Notice of Dec. 16. 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 734

T884,017

MULTIPLE STEP DISPERSE AND BASIC DYE PAD STEAM DYEING OF BLENDS OF POLYESTER AND BASIC DYEABLE POLYESTER WITH OR WITHOUT CELLULOSE DYED WITH CELLULOSIC DYES AND CARPETS DYED THEREBY

Melvin A. Caldwell, 1501 Greenfield Ave., Kingsport, Tenn. 37664

Filed June 29, 1970, Ser. No. 50,927
Int. Cl. D06p *3/82*
U.S. Cl. 8—21
No Drawing. 13 Pages Specification

A composite fabric of cellulose, polyester and basic dyeable polyester is continuously contacted with a basic dye, then contacted with steam, then contacted with a clearing agent such as sodium hypochlorite and finally contacted with a mixture of a dispersed dye and a cellulosic dye. This composite fiber can also be dyed by contacting it with a disperse and basic dye, then with steam, then the above clearing agent and finally with a cellulosic dye. Polyester fibers of reduced dispersed dye affinity can be blended with the cellulosic polyester blend in the latter dyeing process. A polyester faced carpet with the first two mentioned polyesters as the face threads is dyed by padding a disperse dye and a basic dye and then steaming poly(1,4-cyclohexylene dimethylene terephthalate) is used as the first polyester which is not basic dye dyeable while a modified poly(ethylene terephthalate) is used as a basic dye dyeable fiber.